(12) United States Patent
Schuler

(10) Patent No.: US 9,381,897 B2
(45) Date of Patent: Jul. 5, 2016

(54) METHOD FOR OPERATING A VEHICLE AND DRIVER ASSISTANCE DEVICE

(75) Inventor: Thomas Schuler, Wiernsheim (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 329 days.

(21) Appl. No.: 13/988,035

(22) PCT Filed: Nov. 23, 2011

(86) PCT No.: PCT/EP2011/070802
§ 371 (c)(1),
(2), (4) Date: Jul. 16, 2013

(87) PCT Pub. No.: WO2012/072464
PCT Pub. Date: Jun. 7, 2012

(65) Prior Publication Data
US 2014/0046567 A1    Feb. 13, 2014

(30) Foreign Application Priority Data

Nov. 30, 2010   (DE) .......................... 10 2010 052 964

(51) Int. Cl.
*B60T 7/22*       (2006.01)
*B60L 7/18*       (2006.01)
(Continued)

(52) U.S. Cl.
CPC ... *B60T 7/22* (2013.01); *B60L 7/18* (2013.01); *B60L 7/26* (2013.01); *B60L 11/005* (2013.01); *B60L 11/1861* (2013.01); *B60L 11/1868* (2013.01); *B60L 15/2009* (2013.01); *B60W 10/08* (2013.01); *B60W 10/184* (2013.01); *B60W 30/16* (2013.01); *B60W 30/18127* (2013.01); *B60L 2200/26* (2013.01); *B60W 2510/244* (2013.01); *B60W 2550/10* (2013.01);

*B60W 2550/22* (2013.01); *Y02T 10/645* (2013.01); *Y02T 10/7005* (2013.01);
(Continued)

(58) Field of Classification Search
None
See application file for complete search history.

(56) References Cited

U.S. PATENT DOCUMENTS 5,251,680 A   10/1993  Minezawa et al.
5,399,000 A    3/1995  Aoki et al.
(Continued)

FOREIGN PATENT DOCUMENTS

DE   102005054614 A1   5/2007
EP        0361708 A2   4/1990
(Continued)

OTHER PUBLICATIONS

International Search Report issued in PCT/EP2011/070802 mailed Mar. 5, 2012 (6 pages).

*Primary Examiner* — John R Olszewski
*Assistant Examiner* — Nicholas K Wiltey
(74) *Attorney, Agent, or Firm* — Osha Liang LLP

(57) ABSTRACT

The invention relates to a method for operating a vehicle (1), in which energy is recovered in overrun and/or braking phases (T2) of the vehicle (1) and stored in an energy store (4, 5) within the vehicle, wherein the environment (E) of the vehicle (1) is detected by means of a detector (6, 13) and, depending on detection of an object (2, 11) in the vehicle environment (E), at least one object characteristic (v2, Δv, L) is evaluated and, depending on the evaluation of the object characteristic (v2, Δv, L), the overrun and/or braking phase (T2) is performed automatically in a manner adapted to at least one parameter characterizing the energy store (4, 5). The invention also relates to a driver assistance device (7) for a vehicle (1).

9 Claims, 2 Drawing Sheets

(51) Int. Cl.
*B60L 11/18* (2006.01)
*B60W 10/08* (2006.01)
*B60W 10/184* (2012.01)
*B60W 30/16* (2012.01)
*B60W 30/18* (2012.01)
*B60L 7/26* (2006.01)
*B60L 11/00* (2006.01)
*B60L 15/20* (2006.01)

(52) U.S. Cl.
CPC ......... *Y02T 10/7022* (2013.01); *Y02T 10/7044* (2013.01); *Y02T 10/7066* (2013.01); *Y02T 10/72* (2013.01); *Y02T 10/7275* (2013.01); *Y02T 10/92* (2013.01)

(56) References Cited

U.S. PATENT DOCUMENTS

| | | | |
|---|---|---|---|
| 5,466,612 A * | 11/1995 | Fuse et al. | 438/60 |
| 6,256,565 B1 * | 7/2001 | Yanagi et al. | 701/45 |
| 6,622,078 B1 * | 9/2003 | Kuragaki et al. | 701/96 |
| 2007/0228822 A1 * | 10/2007 | Hirata | 303/151 |
| 2008/0077283 A1 * | 3/2008 | Ueyama et al. | 701/1 |
| 2008/0218104 A1 * | 9/2008 | Lukic et al. | 318/139 |
| 2010/0066562 A1 * | 3/2010 | Stahlin et al. | 340/902 |
| 2010/0093487 A1 * | 4/2010 | Jerwick | B60K 6/48 477/3 |
| 2010/0133025 A1 | 6/2010 | Flett | |
| 2010/0250162 A1 * | 9/2010 | White | G01R 31/3679 702/63 |
| 2010/0308765 A1 * | 12/2010 | Moore | H02J 7/0013 320/103 |
| 2011/0115442 A1 * | 5/2011 | Garrastacho | G01R 31/3637 320/157 |

FOREIGN PATENT DOCUMENTS

| | | |
|---|---|---|
| EP | 1193106 A1 | 4/2002 |
| EP | 1839985 A2 | 10/2007 |
| EP | 2168827 A1 | 3/2010 |
| GB | 2470478 A | 11/2010 |
| WO | 2009021598 A1 | 2/2009 |

* cited by examiner

METHOD FOR OPERATING A VEHICLE AND DRIVER ASSISTANCE DEVICE

The invention relates to a method for operating a vehicle, in which energy is recovered in overrun and/or braking phases of the vehicle and stored in an energy store within the vehicle. The invention also relates to a driver assistance device for a vehicle.

Vehicles with a "regenerative brake" or "recuperation brake" are known, in which braking energy is not dissipated but is recovered. In most rail vehicles, braking energy is fed back into the power grid, for example, while some electrically operated motor vehicles have an energy store into which the recovered energy can be fed. In hybrid or electric cars, the electric motors used for driving can generally also be operated as generators and can thus be usefully employed for the braking process. The power generated by the generator is then fed into what are referred to as electrochemical double-layer capacitors (supercaps, goldcaps), for example, and stored. Recovery frequently takes place in the overrun mode of the motor car.

Here, energy recovery is performed, in particular, on the basis of the driving parameters specified by the driver and/or of certain statistical considerations. To answer the question as to whether energy recovery should take place, for example, consideration can be given to whether the motor car is in overrun mode or is accelerating or whether the vehicle driver is making a braking request. It is difficult to decide here whether the use of the mechanical brake (high braking effect) or feedback via the electric generator (moderate to medium braking effect) should be employed. There is the question of a configuration in which energy recovery can be employed to optimum effect.

DE 10 2005 054 614 A1 discloses a method for recovering energy in a hybrid vehicle which, in addition to an internal combustion engine, also comprises an electric machine and a hydraulic or pneumatic brake system. The brake system is actuated by means of a foot brake pedal, wherein at least the initial region of a pedal actuation is detected with the aid of a sensor, and the electric machine is operated as a generator if the driver actuates the foot brake pedal in the initial region.

EP 0 361 708 A2 discloses a vehicle with a regenerative and a friction-based brake, wherein the distribution of braking energy to the two brakes is calculated in accordance with the total braking force demanded by the driver and with a maximum braking force at which the vehicle does not yet skid.

U.S. Pat. No. 5,399,000 describes a hybrid brake system for an electric vehicle having a hydraulic and a regenerative brake, wherein the hydraulic brake is used especially during the beginning of the braking process.

It is the object of the invention to provide a method and a driver assistance device with the aid of which the braking process on a vehicle can be configured in a manner which is safe in traffic and which is intended to recover as much braking energy is possible.

This object is achieved by a method having the features of Patent Claim 1 and by a driver assistance device having the features of Patent Claim 9.

The method according to the invention is used to operate a vehicle in which energy is recovered in overrun and/or braking phases of the vehicle and stored in an energy store within the vehicle. The vehicle can be, in particular, a motor car which has an internal combustion engine and/or an electric motor. The term "overrun phase" is intended, in particular, to mean an operating state of the vehicle in which the drive motor of the vehicle develops an internal braking effect and acts as an "engine brake" but a braking system of the vehicle is not actuated. The term "braking phase" is intended, in particular, to mean a time period during which a vehicle braking process is brought about actively by a braking system in the vehicle. During such overrun and/or braking phases, energy is recovered, that is to say, in particular, that braking energy is recovered. It is possible, in particular, for this braking energy to be fed back into the energy store present in the vehicle. In particular, provision can be made to ensure that the braking energy is not lost in the form of heat. It is also possible for a plurality, in particular for different, energy stores to be present in the vehicle.

According to the invention, the method is distinguished by the fact that the environment of the vehicle is detected by means of a detector and, depending on detection of an object in the vehicle environment, at least one object characteristic is evaluated. The term "environment of the vehicle" can be taken to mean, in particular, a defined detection zone of the detector. In particular, the environment of the vehicle is an area at the front of the vehicle extending in the direction of travel of the vehicle. In particular, the detector can be designed to directly detect an object characteristic of an object. In particular, the detector can be designed to detect objects that typically occur in traffic situations, e.g. pedestrians, vehicles (bicycles, motorcycles, motor cars etc) and objects which are used to control traffic (road signs, traffic signals, lane markings etc). According to the invention, at least one object characteristic is evaluated. The object characteristic can be a visual feature of a detected object, e.g. a shape, consistency or external appearance of the object. According to the invention, the overrun and/or braking phase is performed automatically in a manner adapted to at least one parameter describing the energy store, depending on the evaluation of the object characteristic. It is thus possible, in particular, for the overrun and/or braking phase to be controlled both in accordance with the object characteristic and also in accordance with the at least one parameter.

The parameter can, in particular, be a physical parameter of the energy store, describing the properties of the energy store as such. However, it is also possible for the parameter to be a specifiable parameter which characterizes a desired activation of the energy store (e.g. a specifiable target energy which is to be fed into the energy store).

The method makes it possible to perform the overrun and/or braking phases of the vehicle in a manner adapted to the respective instantaneous traffic situation. This ensures that the vehicle behaves in a manner which is safe in traffic and in conformity with traffic regulations. The braking process can be adapted intelligently to the respectively prevailing situation. The vehicle responds in anticipation and can determine a sequence of motion which leads, on the one hand, to a safe braking process and, on the other hand, allows as much braking energy as possible to be fed back. Energy can be fed back in an ideal manner. Losses of braking energy can be considerably reduced.

Provision can be made for an overrun and/or braking phase to be initiated and performed automatically immediately after the evaluation of the object characteristic. Evaluation is then followed immediately by the overrun and/or braking phase without a significant time delay, enabling it to be performed over a long period of time. This allows very flexible configuration of said phase. Energy can be recovered over a long period of time.

However, it is also possible to provide for no overrun and/or braking phase to take place over a first time interval immediately after the evaluation of the object characteristic and for the overrun and/or braking phase to be performed in a manner adapted to the at least one parameter at a time immediately after the first time interval. Evaluation of the object characteristic can then lead, in particular, initially to a prediction of how the overrun and/or braking phase ought to proceed in the future without the need for such a phase to be initiated at this stage. The corresponding brake systems may already have been parameterized accordingly, for example, thus enabling the precalculated braking process to start at the desired point in time and to take place with the optimum adaptation. This embodiment allows vehicle behaviour with a very large degree of anticipation and ensures intelligent adaptation of the overrun and/or braking processes to the respective future traffic situation that is to be expected.

The at least one parameter describing the energy store is preferably a charge capacity of the energy store. The charge capacity indicates how much energy can be stored by the energy store. Given a knowledge of the charge capacity, the overrun and/or braking phase can then be performed automatically in such a way that the braking energy recovered uses up the capacity of the energy store very well but does not overload said store. As an alternative or in addition, provision can be made for the at least one parameter describing the energy store to characterize a state of charge of the energy store. An energy store which has already been charged to a very large extent can then only take a small amount of recovered energy, and therefore it is possible, given a knowledge of the state of charge, for the fraction of the overrun and/or braking phase during which recovery should be carried out to be performed with corresponding adaptation. As an alternative or in addition, it is also possible to provide for the parameter describing the energy store to characterize at least part of a charging curve of the energy store. The overrun and/or braking phase can then be configured in such a way, in respect of the deceleration values set, that the respective braking energy that is instantaneously produced and is to be recovered is adapted to the charging characteristic of the energy store. The energy store can be charged very gently, and the life thereof is increased.

The vehicle preferably comprises at least two energy stores within the vehicle. The overrun and/or braking phase is then performed automatically in a manner adapted to the at least two energy stores in such a way that a first portion of the energy to be recovered is fed into a first of the at least two energy stores, and a second fraction of the energy to be recovered is fed into a second of the at least two energy stores, said second energy store being different from the first energy store. The two energy stores within the vehicle can then be, in particular, energy stores in which energy storage takes place according to different principles of operation. It is possible to select the recovery route that is ideal for energy storage according to energy considerations. If the power recovered is very high, for example, the braking energy can be introduced principally into an energy store of a kind which has very fast charging behaviour and is not damaged at said high power. If, on the other hand, the braking energy recovered per unit time is low, it can be fed into an energy store of which the maximum charging power is low but which has a high capacity.

The selection of recovery route thus enables energy to be fed back in a manner very well suited to requirements, taking place, for example, in a manner adapted to the respective braking power. The most suitable energy store for the respective situation is selected.

The object characteristic which is evaluated is preferably a speed of the detected object, in particular of a vehicle in front. If the speed of the vehicle operated within the scope of the method, relative to another traffic object, is different from zero, for example, a deceleration may be indicated and the initiation of an overrun and/or braking phase may be advisable. Evaluation of the object characteristic can then lead, in particular, to the conclusion that there is a risk of collision with the object and that braking should be initiated. In this way, collisions are reliably avoided and an operator is assisted in driving the vehicle. As an alternative or in addition, provision can be made for a shape and/or a colour and/or a texture of the object to be evaluated as the object characteristic. This embodiment is advantageous particularly in the case of automatic detection of road signs. If the object is a stop sign, for example, the initiation of a braking process may likewise be indicated. As part of the evaluation of the object characteristic, the stop sign, for example, can then be identified as a stop sign from its characteristic shape (octagon) and/or its signal colour (red), and the overrun and/or braking phase can thus be performed in a manner adapted in accordance with this identification.

The energy store preferably comprises a capacitor, in particular an electrochemical double-layer capacitor. These capacitors, which are also referred to as supercaps or goldcaps, are distinguished by high energy densities and, by virtue of the low internal resistance thereof, allow very rapid charging. They operate electrostatically. The energy store can also comprise a chemical energy store, in which the recovered braking energy is used to effect an endothermic chemical conversion. In particular, the energy store can also be an electrochemical cell, in particular a traction battery. A thermal energy store, in particular a latent heat store, is also possible, in which heat generated during the braking process can be stored directly without the need for conversion into some other form of energy. The energy store can also be a mechanical energy store, e.g. a flywheel. It can also comprise a pressure reservoir for an air conditioning system. It is also possible for a number of these energy stores to be present in the vehicle, it being possible for energy to be fed into a number of these energy stores proportionally during the recovery process.

Two different brakes or brake systems can be provided in the vehicle, namely a conventional mechanical friction brake, which does not allow recovery of braking energy, and a regenerative brake, which can be engaged as an alternative or in addition to the mechanical brake. If a latent heat store is used as an energy store, for example, it is also possible to provide only a single brake system, e.g. in the form of the mechanical friction brake, the waste heat of which, generated during the braking process, can be recovered to the latent heat store.

However, energy recovery is preferably accomplished by means of an electric machine which, in particular, can also be operated as a drive motor for the vehicle. It is then possible, in particular, to operate the vehicle by means of an electric motor, it being possible to employ the electric motor used for driving as a generator during the overrun and/or braking phase. The electric machine then has a dual function, thus saving weight and installation space in the vehicle and hence increasing the energy efficiency of the vehicle.

Detection of the environment of the vehicle, evaluation of the object characteristic and adapted performance of the overrun and/or braking phase preferably take place during automatic vehicle guidance at least partially independent of operating actions of a vehicle driver, e.g. when an ACC (Adaptive Cruise Control) system of the vehicle is activated. In particular, the method can be performed in the context of fully automatic driving. Even if the vehicle driver is inattentive, dangerous situations can be reliably identified and a braking process initiated. Moreover, driving behaviour can be adapted in an anticipatory manner in such a way that as high as possible energy efficiency is obtained through high energy feedback during the overrun and/or braking phases. A vehicle which operates in a fully automatic way can optimize driving behaviour in a manner adapted to the requirements for high safety and energy efficiency.

A driver assistance device according to the invention is designed for a vehicle and serves to control the storage of energy recovered in overrun and/or braking phases of the vehicle in an energy store within the vehicle. The driver assistance device comprises a detector and a control unit, wherein the detector is designed to detect the environment of the vehicle. The control unit is designed, depending on detection of an object in the vehicle environment by the detector, to evaluate information on at least one object characteristic and, in accordance therewith, to perform the overrun and/or braking phase automatically in a manner adapted to at least one parameter characterizing the energy store.

The detector preferably comprises a distance sensor and/or an ultrasonic sensor and/or a camera and/or a radar sensor and/or a lidar sensor. It is also possible for a plurality of the detectors listed to be jointly present, thus allowing higher-quality evaluation of the object characteristic through complementary and redundant information.

The driver assistance device preferably comprises an ACC system, and the driver assistance device is designed to perform the method according to the invention or an advantageous embodiment thereof in an operating mode in which the ACC system is activated.

The preferred embodiments presented for the method according to the invention and the advantages thereof apply correspondingly to the driver assistance device according to the invention.

Further features will become apparent from the claims, the figures and the description of the figures. The features and combinations of features mentioned above in the description and the features and combinations of features mentioned in the description of the figures and/or features and combinations of features shown separately in the figures can be used not only in the respectively indicated combination but also in other combinations or in isolation without exceeding the scope of the invention.

The invention is explained in greater detail below by means of illustrative embodiments. In the drawing.

In the figures, elements which are the same or operate in the same way are provided with the same reference signs.

Figure 1:
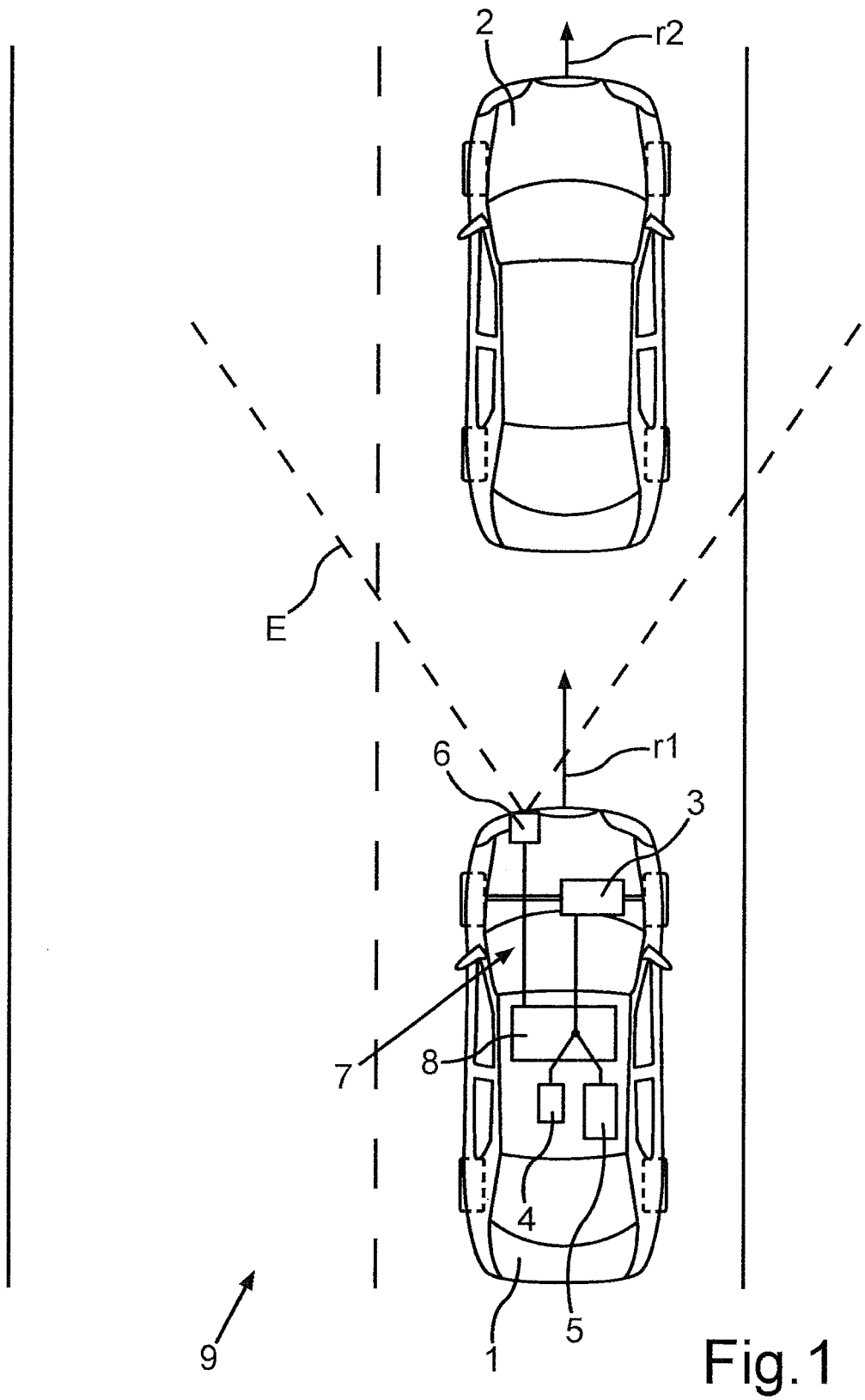
FIG. 1 shows a schematic plan view of a roadway with two vehicles driving one behind the other, of which one comprises an illustrative embodiment of a driver assistance system according to the invention.

FIG. 1 shows a motor car 1, which is moving on the right-hand lane of a roadway 9 in direction r1 at a speed v1, for example. Another motor car 2 is driving ahead of said motor car 1, in the same direction r2 but at a lower speed v2.

Motor car 1 is an electric vehicle, the front wheels of which are driven by an electric motor 3. The electric energy required for this purpose is supplied by a traction battery 5 during the normal driving mode. Moreover, the motor car 1 comprises a driver assistance device 7 having a radar sensor 6 and a control unit 8. The motor car 1 is in an automatic driving mode, which is controlled by the driver assistance device 7. During this process, the radar sensor 6 detects motor car 2 within a detection zone E. Motor car 2 represents an object which can be detected by the radar sensor 6, with the driver assistance device 7 being designed, in particular, in such a way that it can be used to determine the speed v2 of motor car 2. The speed v2 of motor car 2 is thus an object characteristic which is attributable to this object and is evaluated within the driver assistance device 7. This evaluation consists, in particular, in determination of the relative speed of motor cars 1 and 2: $\Delta v = v2 - v1$. The driver assistance device 7 monitors the time variation in this relative speed $\Delta v$. It recognises that the relative speed $\Delta v$ is constant and negative, and therefore there is a risk of collision with motor car 2. Accordingly, performance of an overrun and/or braking phase is recognised as indicated.

In addition to the paramount aspect of safety (avoiding a collision with motor car 2), the driver assistance device 7 also takes account here, in particular, of the aspect of feeding back or recovering as much energy as possible. For the purpose of energy recovery, an overrun phase of motor car 1 can be initiated, and the electric motor 3 can be operated as an electric generator. Three scenarios may be discussed:

In a first scenario, v1 is only slightly greater than v2, and therefore the distance between motor cars 1 and 2 decreases at a moderate rate. There is no immediate risk of a collision between motor cars 1 and 2, and slight deceleration of motor car 1 is sufficient to avoid a collision. The speed can therefore be reduced with a relatively small deceleration value if the reduction in v1 of motor car 1 begins within an appropriate time interval after the determination of the relative speed. The braking effect is achieved by means of the electric motor 3, which is operated as a generator, and only a small amount of braking energy is obtained per unit time. By means of these low braking power outputs, the traction battery 5 can be charged up. Accordingly, the control unit 8 only feeds the energy supplied by the electric motor 3 into the traction battery 5, which is thereby recharged.

The reduction in v1 can be achieved by overrun phases and/or braking phases, it being possible to vary the deceleration value during the reduction in v1.

In a second scenario, v1 is much greater than v2, with the result that the distance between motor cars 1 and 2 decreases very rapidly. Evaluation of the object characteristic $\Delta v$ thus shows that a relatively large and possibly immediate reduction in v1 is required in order to avoid a collision. The overrun and/or braking phase is automatically adapted in such a way that higher deceleration values are obtained. Consequently, larger braking power outputs and hence also higher electric currents per unit time are supplied by the electric motor 3 than in the first scenario. The driver assistance device 7 knows the charging characteristic of the traction battery 5 and knows that the brief high electric power outputs would lead to damage to the traction battery 5. Accordingly, the control unit 8 is instructed not to introduce the current supplied by the electric motor 3 into the traction battery 5 but into a capacitor 4. The charging characteristic of the latter is better adapted to the high generator power outputs.

In a third scenario, v1 is considerably higher than v2, with the result that the distance between motor cars 1 and 2 decreases even more quickly than in the second scenario. By monitoring $\Delta v$, the driver assistance device 7 recognises that there is an immediate prospect of a collision between motor cars 1 and 2. In this situation, the requirement for as high as possible energy recovery is classified as secondary by the driver assistance device 7. Accordingly, the driver assistance device 7 actuates the mechanical brake. To intensify the braking effect, the electric motor 3 is also operated as a generator, with the high braking power outputs allowing recovery to the capacitor 4.

If the driver assistance device 7 detects motor car 2 moving at a low speed v2 at a distance of 100 m, for example, moderate deceleration with little or no assistance from the wheel brakes is sufficient to reduce the car's own speed v1 to match the motor car 2 detected. In this way, energy can be fed back under ideal conditions for as long as possible. For example, the electric motor 3 can be operated precisely at optimum efficiency as a generator. Corresponding control and actuating parameters can be adapted as required.

Figure 2:
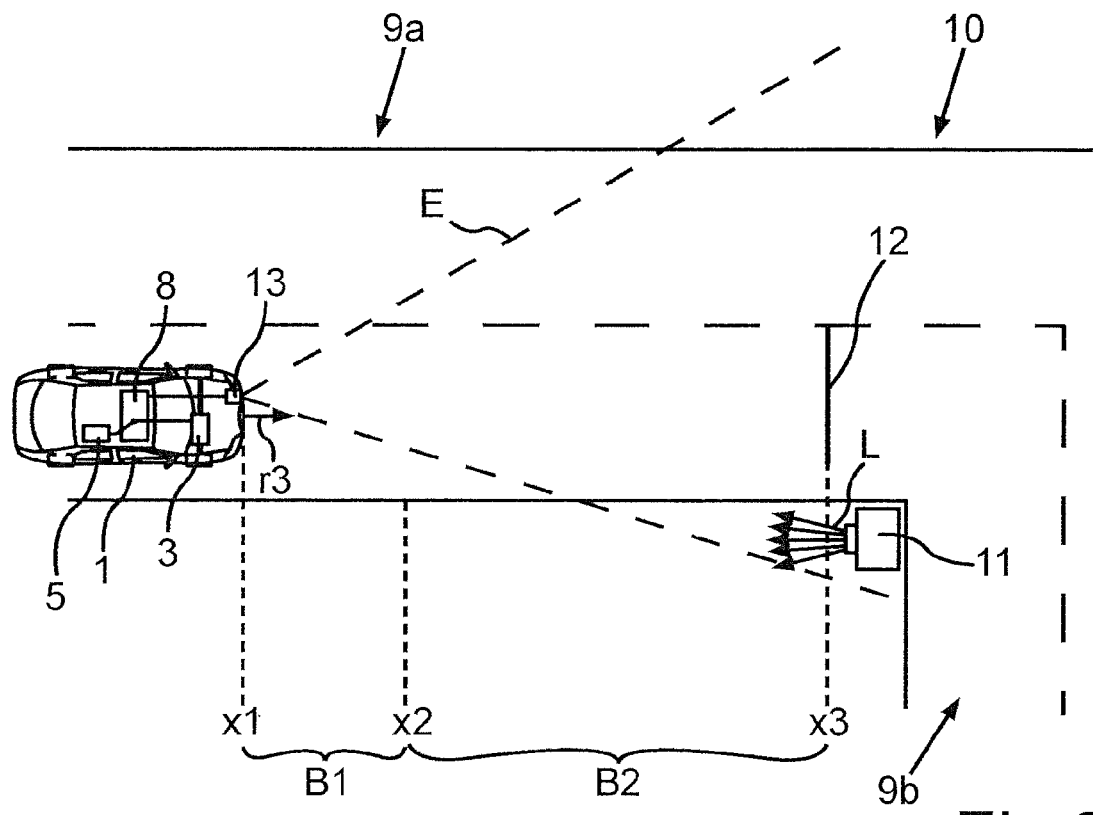
FIG. 2 shows a schematic plan view of a roadway with a motor car moving towards a red traffic light.

A camera 13 with road sign detection or traffic situation detection may also be advantageous for optimum energy feedback. This situation is illustrated in FIG. 2. Motor car 1, the camera 13 of which detects detection zone E, is moving towards a T junction 10 at a speed v3 in direction r3 on a roadway 9a. At the T junction 10, roadway 9b enters roadway 9a. A traffic light 11 is therefore installed ahead of the T junction 10, indicating by emitting red light L that a vehicle must halt at the stop line 12.

The driver assistance device 7 of motor car 1 is designed so that it is capable of detecting the red light L of the traffic light 11 by means of the camera 13 and of evaluating this object characteristic. It is recognised that motor car 1 must reduce speed in order to halt at the stop line 12. After detecting the red traffic light 11, the driver assistance device 7 is consequently already anticipating energy recovery and can parameterize all the systems of motor car 1 accordingly. A corresponding algorithm of the driver assistance device 7 calculates that it is advantageous to hold constant the instantaneous speed v3 from a location x1 to a location x2 (i.e. over a range B1) and, from a location x2, to decelerate motor car 1 in a suitable manner over a range B2, ensuring that it halts at the location of the stop line 12, which is denoted by x3.

Figure 3:
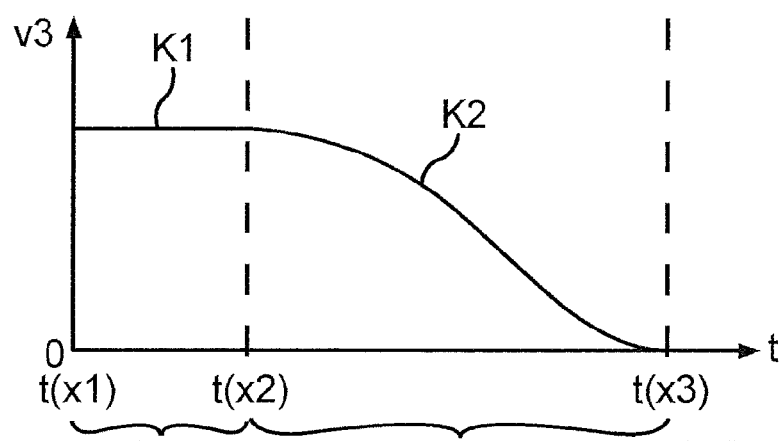
FIG. 3 shows a schematic curve characterizing the braking behaviour of the motor car in FIG. 2.

This driving behaviour is illustrated schematically in FIG. 3. Over a time period T1 between a time t(x1), at which motor car 1 is at location x1, and a time t(x2), at which motor car 1 is at location x2, the speed v3 is held constant in accordance with curve K1. From time t(x2), deceleration begins, and deceleration takes place continuously over a time period T2 until a time t(x3), at which motor car 1 is at location x3 and its speed is reduced to zero. The deceleration behaviour follows a curve K2. Time period T2 thus represents an overrun or braking phase of motor car 1.

The deceleration behaviour according to curve K2 is adapted to the energy store present in motor car 1. In contrast to the illustrative embodiment in FIG. 1, motor car 1 in FIG. 2 has only a traction battery 5 as an energy store. This traction battery 5 has a characteristic charging curve, which is determined by physical parameters. The curve profile of curve K2 is now adapted by the driver assistance device 7 to the charging characteristic of the traction battery 5 in such a way that optimum charging behaviour of said battery is obtained.

Motor car 1 comes to a halt at the stop line 12 in a reliable manner; at the same time, energy is recovered in the best possible way in this situation. In addition, it is also possible to take account of the subjective comfort of vehicle occupants during energy feedback, i.e. in the choice of curve profiles K1 and K2. Such comfort optimization can consist, for example, in avoiding powerful, jerky braking processes, even if they would be advantageous for recovery.

In summary, the method implemented by the driver assistance device makes it possible, with the aid of the environment sensors and/or suitable object tracking algorithms, to employ the ideal strategy to enable an optimum amount of energy to be recovered.

The invention claimed is:

1. A method for operating a vehicle, in which energy is recovered and stored in an energy store within the vehicle, the method comprising:
   detecting the environment of the vehicle using a detector; depending on detection of an object in the vehicle environment, evaluating at least one object characteristic; and
   depending on the evaluation of the object characteristic, automatically performing at least one selected from the group consisting of an overrun phase, a braking phase, and combinations thereof, in a manner adapted to at least one parameter characterizing the energy store,
   wherein the energy is recovered at a first rate during the overrun phase and at a second rate during the braking phase, and
   wherein the energy store comprises at least two different energy storage types each of the at least two different energy storage types having a different charging characteristic, and the at least one selected from the group consisting of the overrun phase, the braking phase, and combinations thereof, is performed such that the energy to be recovered is dynamically fed into one of the at least two energy storage types, whose charging characteristic matches the first and second rate of the energy to be recovered most closely.

2. The method according to claim 1, wherein, at a time immediately after the evaluation of the object characteristic, no overrun and/or braking phase takes place over a first time interval and, at a time immediately after the first time interval, the overrun and/or braking phase is performed in a manner adapted to the at least one parameter.

3. The method according to claim 1, wherein the at least one parameter describing the energy store characterizes one selected from a group consisting of a charge capacity, a state of charge, and at least part of a charging curve of the energy store.

4. The method according to claim 1, wherein at least one selected from the group consisting of a speed of a vehicle in front, a shape, a colour, and a texture of a road sign is evaluated as an object characteristic.

5. The method according to claim 1, wherein the energy store comprises at least one selected from the group consisting of an electrochemical double-layer capacitor, a chemical energy store, an electrochemical cell, a latent heat store, a mechanical energy flywheel, and a pressure reservoir for an air conditioning system.

6. The method according to claim 1, wherein energy recovery is accomplished by an electric machine configured to be operated as a drive motor for the vehicle.

7. The method according to claim 1, wherein detection of the environment of the vehicle, evaluation of the object characteristic, and adapted performance of the overrun and/or braking phase take place during automatic vehicle guidance at least partially independent of operating actions of a vehicle driver.

8. A driver assistance device for a vehicle, for controlling the storage of recovered energy in an energy store within the vehicle, the device comprising:
   a detector and
   a control unit,
   wherein the detector detects the environment of the vehicle,
   wherein the control unit is configured, depending on detection of an object in the vehicle environment by the detector, to evaluate information on at least one object characteristic and, in accordance therewith, to automatically perform at least one selected from the group consisting of an overrun phase, a braking phase, and combinations thereof, in a manner adapted to at least one parameter characterizing the energy store, wherein the energy is recovered at a first rate during the overrun phase and at a second rate during the braking phase, and wherein the energy store comprises at least two different energy storage types each of the at least two different energy storage types having a different charging characteristic, and the at least one selected from the group consisting of the overrun phase, the braking phase, and combinations thereof, is performed such that the energy to be recovered is dynamically fed into one of the at least two energy storage types, whose charging characteristic matches the first and second rate of the energy to be recovered most closely.

9. The driver assistance device according to claim 8, wherein the detector comprises at least one selected from the group consisting of a distance sensor, an ultrasonic sensor, a camera, a radar sensor, and a lidar sensor.

* * * * *